Aug. 13, 1968 JEAN-PIERRE BIET ET AL 3,397,370

DELAY LINE HAVING A THERMOELECTRIC GENERATOR RESPONSIVE TO RATE OF HEAT TRANSFER

Filed Oct. 22, 1965 2 Sheets-Sheet 1

INVENTORS
JEAN-PIERRE BIET
CHARLES DUFOUR
BY Paul M. Craig, Jr.
ATTORNEY

Aug. 13, 1968 JEAN-PIERRE BIET ET AL 3,397,370
DELAY LINE HAVING A THERMOELECTRIC GENERATOR
RESPONSIVE TO RATE OF HEAT TRANSFER
Filed Oct. 22, 1965 2 Sheets-Sheet 2

INVENTORS
JEAN-PIERRE BIET
CHARLES DUFOUR
BY Paul M. Craig, Jr.
ATTORNEY

United States Patent Office 3,397,370

Patented Aug. 13, 1968

3,397,370

DELAY LINE HAVING A THERMOELECTRIC GENERATOR RESPONSIVE TO RATE OF HEAT TRANSFER

Jean-Pierre Biet, Saulx-les-Chartreux, and Charles Dufour, Paris, France, assignors to Compagnie Generale d'Electricite, Paris, France, a corporation of France Filed Oct. 22, 1965, Ser. No. 502,075
Claims priority, application France, Dec. 3, 1964, 997,279
18 Claims. (Cl. 333—29)

The present invention relates in general to a device which is incorporated in an alternating current transmission circuit and which supplies, through the intermediate use of the velocity of propagation of a heat transfer, a time delay for the propagation of an electric current or the creation of a suitable phase shift therein. More particularly, the invention is directed to a heat transfer device equipped with a thermoelectric generator at the output thereof.

In high frequency technology, it is known to provide by means of discrete components or by distributed characteristics, delay lines providing a range of delays whose upper limit may attain several tens or microseconds; however, longer delays necessitate the use of elements having prohibitive overall dimensions and an extremely high cost. In addition, the frequency limitations on such elements is imposing. On the other hand, the speed of the transmission of a thermal flux in a solid body, even with reduced dimensions, makes it possible to attain delays ranging generally from several tens of milliseconds to several seconds.

In an article in Electronics, July 27, 1964, entitled, "Low Frequency Integrated Circuits Achieved With Thermal Transfer," by W. T. Matzen and R. A. Meadows, the use of thermal transfer elements in place of conventional resistors and capacitors to achieve circuits having frequency response below 100 cycles per second is discussed. The use of such thermal transfer elements is particularly applicable to semiconductor integrated circuits where inductances, capacitances or large values of resistance at low frequencies cannot be achieved without an undesirable increase in the size of the conventionally used components.

However, such problems are solved through use of the heat transfer analogy to an RC transmission line, wherein heat flow is analogous to current and temperature to voltage. The thermal transfer element provided in accordance with this known teaching consists of a heater transistor and a sensor transistor mounted at spaced points in a common silicon substrate, the thermal path between the transistors providing the transmission line-like thermal characteristics.

The present invention employs a thermal transfer device which affords advantages as compared to the known device and is distinguished thereover particularly by the use of a thermoelectric generator. The thermoelectric electromotive force is determined by a temperature difference $\Delta T$ between two semiconducting elements of the generator which receive a thermal flux along two separate paths of different thermal impedance such that an independence of the operation with respect to the ambient temperature is achieved.

According to the present invention, a thermal transfer device includes one thermal path in the form of a thermal transmission line constituted by a solid body capable of efficiently conducting heat connected at one end thereof, to a heating element energized by an electric current and, on the other end, to an element of a thermoelectric generator, the generator also being connected to the heating element by way of a second thermal path of less heat conducting efficiency.

According to another characteristic of the present invention, the thermoelectric generator mentioned above comprises two elements connected respectively to the aforementioned heating element by two paths of thermal transmission, the thermoelectric effect obtained being controlled by the temperature difference between the two elements of said generator.

According to yet another charactristic of the present invention, the thermoelectric generator is connected to the aforementioned heating element by two paths of thermal transmission having approximately the same thermal resistance, one of these paths having a low thermal capacity and the other a relatively considerable thermal capacity.

In accordance with yet another characteristic of the present invention, the differential thermal paths eliminate the direct component of the output current of the aforementioned thermoelectric generator, representative of the ambient temperature of the device thereby making the device substantially independent of outside temperature.

The present invention is suitable to be incorporated in any desired electric circuits, particularly in integrated circuits.

These and further objects, features, and advantages of the present invention will become more obvious from the following description when taken in connection with the accompanying drawing, which shows, for purposes of illustration only, several embodiments in accordance with the present invention, and wherein.

Figure 1:
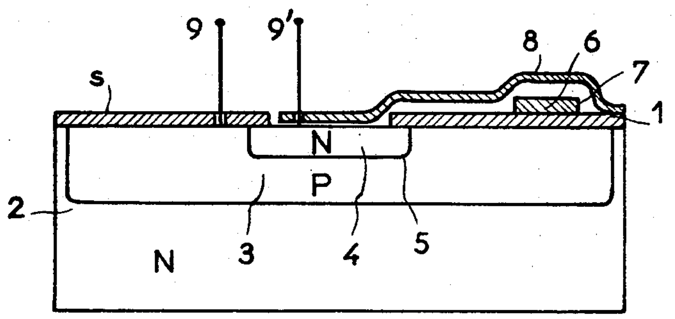
FIGURE 1 is a cross-sectional view through a thermal transfer device according to the present invention.

The thermoelectric element illustrated in FIGURE 1 provides a PN junction in a silicon monocrystal, comprising a silicon block 2 wherein a layer of P-type material 3 and a layer of N-type material 4 have been provided, for example, by diffusion. The two layers 3 and 4 are separated by a junction 5 which has thermoelectric properties, and the upper surface of the element is protected by a silica layer 1.

A resistance 6 constituting the heating element for this device is energizing by an electric current by means of two connections 7 and 7'. A thermal connection is assured between the heating resistance 6 and the N-type layer 4 by means of a coating 8 made from beryllium oxide, which is capable of conducting the heat generated by heater 6, but is electrically insulating so as not to disturb the current in the heater circuit. On the other hand, there also exists a path of thermal transmission between the heater 6 and the P-type layer 3 through the body of silicon 2. There thus is created due to the different thermal paths, a temperature difference $\Delta T$ between the layers 3 and 4 which results in the generation of a thermoelectric force between the layers appearing at the output connections 9 and 9'.

Figure 2:
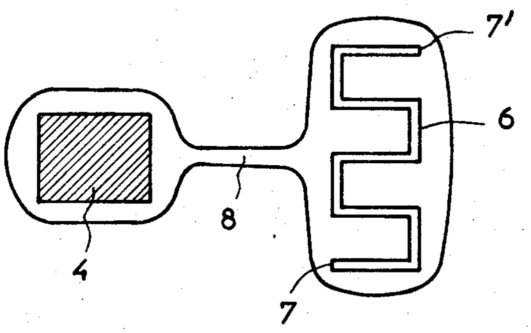
FIGURE 2 is a plan view of a portion of the device illustrated in FIGURE 1.

FIGURE 2 shows the N-type layer 4 and the manner in which the beryllium oxide layer 8 connects the layer 4 to the heater 6. The heating resistance 6 may be constituted preferably—as is frequently the case in integrated circuits—of a nickel-chromium layer deposited by evaporation and cut, or stamped out, in "fretwork," but it could equally have any other conventional configuration without departing from the spirit and scope of the present invention.

Figure 3:
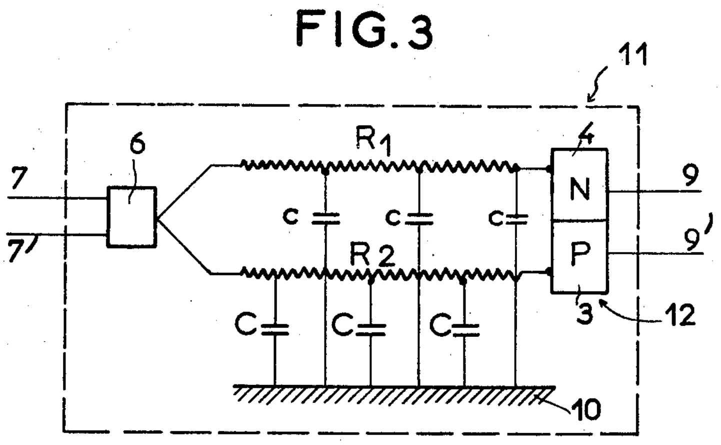
FIGURE 3 is an equivalent schematic circuit diagram of the device according to the present invention.

FIGURE 3 shows a schematic view of an equivalent circuit of the device of FIGURE 1 according to the present invention. The heating resistance 6 is energized by means of the connections 7, 7' from a current source (not shown) and the thermoelectric element 12 is provided with the P and N type layers 3 and 4, respectively. A first path of thermal transfer between the heating resistance 6 and the layer 4 displays a certain thermal resistance $R_1$ and a low thermal capacity symbolized by small condensers *c* connected to a heat sink 10. There is also present a second path of thermal transfer between the resistance 6 and the layer 3, which has a thermal resistance $R_2$ and a significant thermal capacity symbolized by the condensers C connected to the heat sink 10. The entire unit of the thermal transfer device is contained in a frame shown in dashed lines 11.

Figure 4:
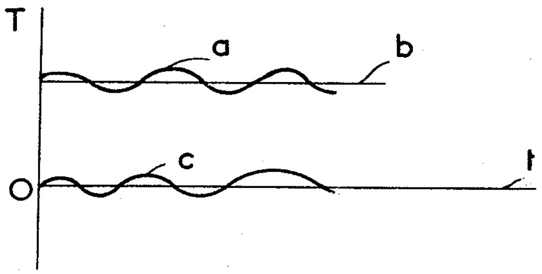
FIGURE 4 is a diagram explaining the operation of the invention.

The thermal transfer path of the resistance $R_1$ having a low thermal capacity *c* may be, for example, the beryllium oxide layer 8 of FIGURES 1 and 2. The thermal resistance path $R_2$ having a strong thermal capacity C may be, for instance, the result of diffusion in the volume of silicon 2 of FIGURE 2. By means of an appropriate design or dimensioning of the elements, the thermal resistances $R_1$ and $R_2$ may preferably be given the same value. The result thereof is the temperature diagram illustrated in FIGURE 4. In FIGURE 4, the curve *a* shows the temperature variation of the layer 4 as a function of time. It displays an undulation which is an image of the variation of instantaneous power of energization of the resistance 6 in FIGURE 3.

On the other hand, due to the existence of the elevated thermal capacities C of FIGURE 3, the layer 3 will assume a uniform or ambient temperature. Curve *b*, which represents the temperature of layer 3, has a constant value equal to the average value of the curve *a*, since the thermal resistances $R_1$ and $R_2$ are equal over the two paths. It is thus obvious that the temperature difference $\Delta T$ between the layers 3 and 4 as a result of the separate thermal paths to these layers has a purely alternating variation according to curve *c*, which is the difference between curves *a* and *b*. That is to say, the thermoelectric force which, for a suitable choice of the parameters, varies more or less linearly with $\Delta T$, thus reproduces faithfully—with the exception of the introduction of a time delay—the variation of the instantaneous heating power of the resistance 6.

Figure 5:
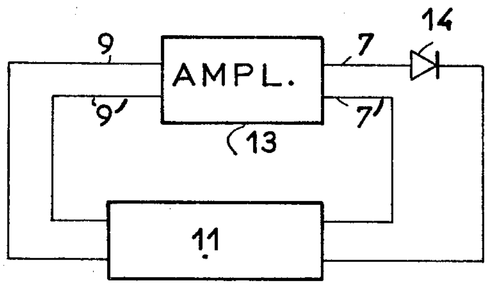
FIGURE 5 is a schematic block diagram of an exemplary circuit utilizing the heat transfer circuit of the present invention.

Illustrated in FIGURE 5 is an exemplary embodiment of one application of the thermal transfer device 11 according to the present invention which is inserted in a feedback loop between the input and the output of an amplifier 13 by means of the terminals 9 and 9' and 7 and 7' thereof, respectively. The loop may either constitute a reaction path in which case the complete system will oscillate on a frequency determined particularly by the thermal delay of the device according to the present invention, or the loop may constitute a counter-reaction path, and the complete system will then take the form of a selective amplifier.

If the heating element 6 is energized by a current having a frequency *f* and a sine wave configuration, the electric force of thermoelectric origin is a function of $\sin^2$ with a fundamental frequency $2f$. Therefore, in order to provide again at the terminals 9 and 9' a fundamental frequency *f* equal to that of the output current at the terminals of the amplifier, it is advantageous to insert in the output circuit of the amplifier a rectifying element, for example a diode 14, in series with the device 11 in such a manner as to apply thereto only one-half of the output waveform of the amplifier.

Within the framework of the present invention, the device operates for electric currents of whatever form, particularly those with pulses.

While we have shown and described several embodiments in accordance with the present invention, it is understood that the same is not limited thereto, but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A thermal delay device providing a thermoelectric effect comprising:
   thermoelectric generator means for providing an electrical signal in response to a temperature differential,
   heating resistance means for generating heat in response to application of an electrical control signal,
   a first thermal path of low thermal capacitance connecting said heating resistance means to one side of said thermoelectric generator means, and
   a second thermal path of higher thermal capacitance than said first thermal path connecting said heating resistance means to another side of said thermoelectric generator means.

2. A thermal delay device as defined in claim 1 wherein said first thermal path consists of an electrically insulating body having good heat conducting properties positioned with one end thereof in contact with said heating resistance means and the other end in contact with one side of said thermoelectric generator means.

3. A thermal delay device as defined in claim 1 wherein said thermoelectric generator means includes a layer of P-type semiconducting material and a layer of N-type semiconducting material, the junction therebetween exhibiting thermoelectric properties.

4. A thermal delay device as defined in claim 3 wherein said layer of N-type semiconducting material comprises said one side of said thermoelectric generator means and said layer of P-type semiconducting material comprises said other side of said thermoelectric generator means.

5. A thermal delay device as defined in claim 4 wherein said second thermal path comprises a block of N-type semiconducting material, said thermoelectric generator means being mounted in one portion of said block of N-type material with said layer of P-type material in contact therewith.

6. A thermal delay device as defined in claim 2 wherein said electrically insulating body comprises a layer of beryllium oxide.

7. A thermal delay device as defined in claim 1 wherein said heating resistance means comprises a resistance heater element capable of generating heat in proportion to the amplitude of an electrical control signal applied thereto.

8. A thermal delay device as defined in claim 1 wherein said first and second thermal paths have substantially the same thermal resistance.

9. A thermal delay device as defined in claim 5 wherein said block of N-type material comprises a block of silicon.

10. In an electric transmission circuit having an input and an output, a thermal delay device comprising:
    thermoelectric generator means for providing an electrical signal in response to a temperature differential having a pair of output terminals connected thereto for carrying said electrical signal,
    heating resistance means having a pair of input terminals for generating heat in response to an electrical control signal applied to said input terminals,
    a first thermal path of low thermal capacitance connecting said heating resistance means to one side of said thermoelectric generator means, and
    a second thermal path of higher thermal capacitance than said first thermal path connecting said heating resistance means to one side of said thermoelectric generator means, said input terminals of said heating resistance means being connected to the output of said transmission circuit and said output terminals of said thermoelectric generator means being connected to the input of said transmission circuit.

11. In an electric transmission circuit as defined in claim 10 wherein said input terminals and said output terminals of said thermal delay device are connected respectively to the output and input of the same amplifier.

12. In an electric transmission circuit as defined in claim 10, diode means connected between the output of said circuit and the input terminals of said heating resistance means for blocking a portion of the wave applied to said thermal delay device.

13. An electric transmission circuit as defined in claim 10 wherein the first thermal path of said thermal delay device comprises a layer of beryllium oxide and said second thermal path is provided by a block of silicon supporting said thermoelectric generator means.

14. A thermal delay device as defined in claim 10 wherein said thermoelectric generator means includes a layer of P-type semiconducting material and a layer of N-type semiconducting material, the junction therebetween exhibiting thermoelectric properties.

15. A thermal delay device as defined in claim 14 wherein said layer of N-type semiconducting material comprises said one side of said thermoelectric generator means and said layer of P-type semiconducting material comprises said other side of said thermoelectric generator means.

16. A thermal delay device as defined in claim 10 wherein said first and second thermal paths have substantially the same thermal resistance.

17. A thermal delay device providing a thermoelectric effect comprising:

thermoelectric generator means for providing an electrical signal in response to a temperature differential including a layer of P-type semiconducting material and a layer of N-type semiconducting material, the junction therebetween exhibiting thermoelectric properties, heating resistance means for generating heat in proportion to the amplitude of an electrical control signal applied thereto including a resistance heater element, a first thermal path of low thermal capacitance connecting said heating resistance means to said layer of N-type material in said thermoelectric generator means comprising a block of silicon supporting said thermoelectric generator means, a second thermal path of higher capacitance than said first thermal path connecting said heating resistance means to said layer of P-type material in said thermal electric generator means comprising a block of silicon supporting said thermal electric generating means.

18. A thermal delay device as defined in claim 17 wherein said first and second thermal paths have substantially the same thermal resistance.

References Cited

Matzen and Meadows, Low Frequency Integrated Circuits Achieved With Thermal Transfer, Electronics, July 27, 1964.

ELI LIEBERMAN, *Primary Examiner.*